US008725401B2

(12) United States Patent
Daveze et al.

(10) Patent No.: US 8,725,401 B2
(45) Date of Patent: May 13, 2014

(54) AVOIDANCE METHOD AND SYSTEM FOR AN AIRCRAFT

(75) Inventors: Fabien Daveze, Toulouse (FR); Vincent Foucart, Ramonville Saint-Agne (FR); Paule Botargues, Toulouse (FR); Didier Averseng, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 1719 days.

(21) Appl. No.: 11/576,658

(22) PCT Filed: Oct. 6, 2005

(86) PCT No.: PCT/FR2005/002460
§ 371 (c)(1),
(2), (4) Date: Apr. 4, 2007

(87) PCT Pub. No.: WO2006/040441
PCT Pub. Date: Apr. 20, 2006

(65) Prior Publication Data

US 2008/0021647 A1 Jan. 24, 2008

(30) Foreign Application Priority Data

Oct. 8, 2004 (FR) ..................................... 04 10613

(51) Int. Cl.

| | |
|---|---|
| ***G06F 17/10*** | (2006.01) |
| ***G06G 7/78*** | (2006.01) |
| ***G08G 1/16*** | (2006.01) |
| ***G06F 7/00*** | (2006.01) |
| ***G01C 23/00*** | (2006.01) |
| ***G05D 1/00*** | (2006.01) |
| ***G05D 3/00*** | (2006.01) |
| ***G06F 17/00*** | (2006.01) |

(52) U.S. Cl.
USPC ............................................... 701/301; 701/3

(58) Field of Classification Search
USPC ......................................................... 701/301
See application file for complete search history.

(56) References Cited

U.S. PATENT DOCUMENTS

| | | | | |
|---|---|---|---|---|
| 3,530,465 A | | 9/1970 | Treffeisen et al. | |
| 4,293,857 A | * | 10/1981 | Baldwin | 342/32 |
| 4,924,401 A | * | 5/1990 | Bice et al. | 701/6 |
| 5,136,512 A | * | 8/1992 | Le Borne | 701/301 |
| 5,414,631 A | * | 5/1995 | Denoize et al. | 701/301 |
| 5,984,240 A | * | 11/1999 | Shinagawa | 244/195 |
| 6,088,654 A | * | 7/2000 | Lepere et al. | 701/301 |

(Continued)

FOREIGN PATENT DOCUMENTS

EP 0545473 6/1993

OTHER PUBLICATIONS

PCT International Search Report dated Jan. 25, 2006.

(Continued)

*Primary Examiner* — Khoi Tran
*Assistant Examiner* — Nicholas Kiswanto
(74) *Attorney, Agent, or Firm* — Dickinson Wright PLLC

(57) ABSTRACT

Disclosed is a method and system for avoiding collision between an aircraft A and an intruder aircraft. The method and system involve determining avoidance presets to avoid a collision between the aircraft A and the intruder aircraft, in which the avoidance presets comprise a vertical speed preset. The presets are determined from avoidance information received from an anticollision system, and the determined avoidance presets are transmitted to at least one guidance device that guides the aircraft A based on the avoidance presets.

41 Claims, 5 Drawing Sheets

(56) References Cited

U.S. PATENT DOCUMENTS

| | | | | |
|---|---|---|---|---|
| 6,168,117 | B1 * | 1/2001 | Shinagawa | 244/195 |
| 6,433,729 | B1 * | 8/2002 | Staggs | 342/29 |
| 6,480,120 | B1 * | 11/2002 | Meunier | 340/970 |
| 6,510,388 | B1 | 1/2003 | Sporrong et al. | |
| 6,675,076 | B1 * | 1/2004 | Moody | 701/11 |
| 6,691,950 | B2 * | 2/2004 | Salesse-Lavergne | 244/17.13 |
| 7,098,810 | B2 * | 8/2006 | Bateman et al. | 340/963 |
| 7,444,211 | B2 * | 10/2008 | Charles | 701/3 |
| 7,693,614 | B2 * | 4/2010 | Turung | 701/3 |
| 7,774,131 | B2 * | 8/2010 | Deker | 701/528 |
| 2002/0152029 | A1 * | 10/2002 | Sainthuile et al. | 701/301 |
| 2003/0107499 | A1 * | 6/2003 | Lepere et al. | 340/945 |

OTHER PUBLICATIONS

John S. Denker; “See how it flies,” Lift, Trust, Weight, and Drag, XP002330050, Jun. 3, 2004, retrieved from the internet: URL:// http://www.av8n.com/how/htm/4forces.html>, pp. 1-8.

Henry A. Pearson; “Study of inadvertent speed increases in transport operation,” 1953, XP002330051, retrieved from the internet: URL:http://wwnaca.Larc.nasa.gov/digidoc/report/tr/38/NACA-TR-1138.pdf> pp. 703-705.

* cited by examiner

AVOIDANCE METHOD AND SYSTEM FOR AN AIRCRAFT

FIELD OF THE INVENTION

The present invention relates to an avoidance method and system for an aircraft, in particular a transport plane.

More precisely, the invention applies to an avoidance system comprising an anticollision system which is able:

- to detect a risk of collision with another aircraft called an intruder aircraft hereinbelow (that is to say which effects an intrusion into the space close to the current position of the aircraft considered); and
- during such a detection, to emit an alarm and to determine avoidance information specified hereinbelow.

BACKGROUND OF THE INVENTION

An intruder aircraft avoidance maneuver is a tricky maneuver, since the crew is required to avoid the trajectory of the intruder aircraft while remaining in control of its own aircraft and of the trajectory of the latter. Two problems may in particular occur during such a maneuver:

- the pilot pushes the aircraft to the limit or outside of its flight envelope. This triggers other alarms which get added to the initial alarm;
- the pilot quits his flight plan to carry out the avoidance. In this case he risks crossing the trajectory of a third aircraft. This often results in a disruption of the air traffic, in particular in the approach zones to large airports.

It is known that an anticollision system, in particular of TCAS type (Traffic alert and Collision Avoidance System), makes it possible to monitor the trajectories of the aircraft in proximity to the aircraft considered and to represent their respective positions on a viewing screen, for example of ND (Navigation Display) type.

This anticollision system is based on an exchange of information by way of transponders. With the aid of the altitude and of the distance, which are exchanged for example every second, said anticollision system calculates the trajectory of any intruder aircraft. It then estimates the potential danger and calculates an appropriate maneuver to avoid it. This maneuver is executed solely in the vertical plane.

Intruder aircraft are generally classed into several categories according to their proximity. Thus the following alerts or alarms are distinguished:

- a traffic advisory which makes it possible to signal the machines which are between 25 and 40 seconds from the aircraft. The pilot must monitor the evolution of the trajectories of these machines, but no maneuver or limitation is imposed upon him; and
- a firm alarm or alert (referred to as an alarm hereinbelow) [resolution advisory] which forewarns of close danger (less than 25 seconds). On the basis of the data relating to the two aircraft (altitude, distance and speed), the anticollision system devises two possible maneuvers:
  - a first maneuver associated with a preventive alert, which consists in maintaining the current trajectory;
  - a second maneuver associated with a corrective alert, which consists in executing a climb or a descent at a rate defined by the anticollision system until the danger is cleared. This maneuver is performed solely in the vertical plane.

During a firm alarm or alert of resolution advisory type, a particular signpost is generally presented on a vertical speed scale of the primary piloting screen of the aircraft. Two zones are displayed on this scale:

- a red zone which represents a prohibited vertical speed zone; and
- a green zone in which the pilot must place the vertical speed of the aircraft in order to avoid the intruder aircraft.

In case of corrective alarm, the pilot is required to disengage the automatic pilot, as appropriate, and to perform the avoidance maneuver manually. To do this he must actuate the control stick so as to place the vertical speed in the aforesaid green safety zone. In practice, pilots are required to track the limit vertical speed between the red zone and the green zone.

However, experience shows that the tracking of a vertical speed preset is not intuitive for a pilot. Specifically, the vertical speed is not a primary piloting parameter, like the attitude or the air speed for example. Pilots thus tend to exceed the preset, which may bring about:

- a strong variation in the load factor, which is detrimental to the comfort and to the safety of the passengers;
- an abrupt variation in the speed and in the angle of incidence, which involves a risk of exiting the flight envelope; and
- a significant deviation of the trajectory with respect to the initial trajectory, which disrupts the air traffic in zones of dense traffic.

To attempt to remedy these drawbacks, a known solution advocates displaying on the primary piloting screen an avoidance preset expressed in terms of attitude. To do this, the vertical speed preset is converted into a value of attitude, which is easier to control by the pilot. This representation is known by the name "pitch cues".

However, the manual avoidance implemented in this case remains very dynamic and does not cope with all the problems previously alluded to (in particular because the pitch or attitude indications are calculated with a relatively high gain so as to induce the pilot to carry out a fast avoidance maneuver.

SUMMARY OF THE INVENTION

The object of the present invention is to remedy these drawbacks. It relates to a method of avoidance making it possible to prevent, during the in-flight avoidance of an intruder aircraft, abrupt variations in load factor, by carrying out an optimal maneuver and accurate feedback control with regard to the appropriate preset value.

For this purpose, according to the invention, said method of avoidance for an aircraft comprising an anticollision system which is able:

- to detect a risk of collision with at least one intruder aircraft; and
- during such a detection, to emit an alarm (i.e. a corrective alarm or a preventive alert as described above) and to determine avoidance information, is noteworthy in that, during the emission of an alarm:

a) at least avoidance presets which make it possible to avoid any collision if they are applied to the aircraft are determined automatically on the basis of corresponding avoidance information; in order to do this, first presets which are expressed in terms of vertical speed and which make it possible to avoid a collision are determined on the basis of said avoidance information; and b) these avoidance presets are transmitted automatically to at least one avoidance aid means.

Advantageously, in step a), these first presets are transformed into corresponding presets expressed in terms of load factor in such a way as to form said avoidance presets. Preferably, to transform said first presets which are expressed in terms of vertical speed into avoidance presets which are expressed in terms of load factor, the following expression is used:

$$NZcom=K\cdot(VZcurrent-VZtarget)$$

in which:

NZcom represents the value of the commanded load factor, which is used to guide the aircraft;

VZcurrent is the value of the current vertical speed of the aircraft;

VZtarget is the value of a target vertical speed; and

K is a variable dependent on the current speed of the aircraft.

Furthermore:

in a first variant, said first presets are determined in such a way as to get as close as possible to a zero vertical speed, while complying with said avoidance information; and in a second variant, said first presets are determined in such a way as to minimize the deviation between the avoidance trajectory of the aircraft and the initial trajectory (before the alarm).

In a first embodiment, in step b), the avoidance presets are transmitted automatically to an automatic guidance device of the aircraft, which is able to implement a mode of guidance making it possible to guide the aircraft automatically in accordance with avoidance presets received, when an automatic pilot is engaged and when said guidance mode is triggered.

Thus, by virtue of an automatic guidance device, it is possible to remedy the aforesaid drawbacks due to a manual avoidance implemented directly by the pilot. Specifically, the present invention thus makes it possible to avoid abrupt variations in load factor, by carrying out an optimal maneuver and accurate feedback control with regard to the preset. This gives rise to better comfort for the passengers, a greater safety margin vis-à-vis the flight envelope, a minimal discrepancy with respect to the preset altitude and hence a reduced disruptance of the air traffic.

It is known that an automatic guidance device ensures excellent performance for all captures and all maintainings of presets and better reproducibility than pilots. Also, the maneuver carried out by an automatic guidance device is more comfortable and closer to the preset than that carried out manually by a pilot.

Furthermore, an automatic maneuver makes it possible to relieve the pilot of a piloting task (avoidance maneuver) which has been done manually hitherto, thereby leaving him in particular more time to identify the one or more intruder aircraft during this highly stressful situation.

It will be noted that within the framework of the present invention:

a firm alarm or alert of the aforesaid resolution advisory type is called an “alarm”. Such an alarm may be a preventive alert or a corrective alarm; and when there is reason to distinguish between the two types of alarm, it is specified specifically.

In a first variant embodiment, during the emission of an alarm, if the automatic pilot is previously engaged:

a message is displayed to warn a pilot of the alarm; and said guidance mode (implemented by said automatic guidance device) is triggered when the pilot actuates a means of actuation provided for this purpose.

Furthermore, in a second, preferred variant embodiment, during the emission of an alarm, if the automatic pilot is previously engaged, said guidance mode is triggered automatically by the emission of this alarm. This makes it possible to relieve the pilot of this triggering and thus of the entire avoidance procedure. In this case, advantageously, said guidance mode is able to be stopped by the pilot, by the actuation of a means of actuation provided for this purpose.

Furthermore, advantageously:

in a first variant, during the emission of an alarm, if the automatic pilot is not engaged, said guidance mode is triggered automatically when a pilot engages said automatic pilot; and in a second variant, if the automatic pilot is not engaged, it engages automatically and said guidance mode is triggered automatically during the emission of an alarm.

Moreover, advantageously, if a corrective alarm is replaced by a preventive alert, a guidance mode previously triggered remains operational.

Additionally, in a particular embodiment, a previously triggered guidance mode is stopped automatically, when one of the following situations arises:

the pilot disengages said automatic pilot;

the pilot triggers another guidance mode;

the anticollision system emits an end-of-alarm signal.

As a variant of or as a supplement to the first aforesaid embodiment (according to which the avoidance aid means comprises an automatic guidance device), in a second embodiment, in step b), the avoidance presets are transmitted automatically to a flight director which implements a mode of display making it possible to display information representative of said avoidance presets, when it is engaged and when said display mode is triggered. Preferably, said information represents load factor presets.

When this second embodiment is used as a variant to said first embodiment, the pilot is provided with the information allowing him to carry out a manual avoidance, by tracking the piloting presets displayed.

Of course, this second embodiment may also be used as a supplement to said first embodiment. In this case, the avoidance maneuver is carried out automatically by means of said automatic guidance device, but the pilot can monitor it and decide at any moment to resume this maneuver manually, while then benefiting from a continuity of display on the flight director during the change of piloting mode.

The various modes of triggering the display mode implemented by the flight director may be deduced in a similar manner to those mentioned above of the guidance mode implemented by the automatic guidance device.

It will be noted that, when the pilot disengages the automatic pilot, the previously triggered guidance mode is exited and a display mode is triggered on a flight director or it is maintained engaged if it already was.

Advantageously, during the emission of a preventive alert:

if one is initially in a guidance mode able to vary the vertical speed of the aircraft, a vertical speed maintain mode is engaged guiding towards the current vertical speed of the aircraft;

if one is initially in a guidance mode guaranteeing a constant vertical speed, this guidance mode is maintained.

Moreover, advantageously, during the emission of a corrective alarm, a specific mode guiding towards a target value of vertical speed is engaged.

Furthermore, advantageously, during the emission of an alarm:

if one is initially in a lateral guidance mode, this lateral guidance mode is maintained; and if initially no lateral guidance mode is engaged, a mode for maintaining the current heading is engaged.

Additionally, advantageously, during the emission of an alarm, there is engaged a system for automatic control of the thrust of the engines of the aircraft in a speed maintain mode, regardless of the initial state of said system for automatic control of the thrust.

Additionally, advantageously, during the emission of a preventive alert, for the exiting from an avoidance maneuver when the anticollision system emits an end-of-alarm signal, the guidance modes used during this avoidance maneuver are maintained.

Moreover, advantageously, during the emission of a corrective alarm, for the exiting from an avoidance maneuver when the anticollision system emits an end-of-alarm signal, a mode making it possible to rejoin the initial trajectory is engaged. To do this, in a preferred manner:

- longitudinally, a vertical speed maintain mode is engaged and an altitude capture mode is enabled in such a way as to capture a target altitude when the latter is attained by the aircraft so as to rejoin the initial trajectory; and
- laterally, the current guidance mode is maintained.

Furthermore, advantageously, during a change of alarm in the course of an avoidance maneuver, the maneuver is reinitialized.

Additionally, advantageously, during the emission of a preventive alert, if an altitude capture mode is enabled, it is maintained enabled.

Moreover, advantageously, during the emission of a corrective alarm, if an altitude capture mode is enabled:

- if a predetermined value "0 feet/minute" is not in a prohibited domain of vertical speed, said altitude capture mode is maintained enabled;
- otherwise, it is disabled.

Additionally, advantageously, during the emission of a preventive alert, an avoidance mode is presented to the pilot as enabled, and is done so according to a first particular presentation.

Furthermore, advantageously, during the emission of a corrective alarm, an avoidance mode is presented to the pilot as engaged, and is done so according to a second particular presentation.

The present invention also relates to an avoidance system for an aircraft, in particular a civil transport plane.

According to the invention, said avoidance system of the type comprising an anticollision system which is able:

- to detect a risk of collision with at least one intruder aircraft; and
- during such a detection, to emit an alarm and to determine avoidance information, is noteworthy in that it moreover comprises:

- means of calculation (preferably as part of an automatic pilot) for automatically determining during the emission of an alarm, on the basis of avoidance information received from said anticollision system, at least avoidance presets which make it possible to avoid any collision if they are applied to the aircraft, said means of calculation comprising means for determining, on the basis of said avoidance information, first presets which are expressed in terms of vertical speed and which make it possible to avoid a collision; and
- at least one avoidance aid means which is connected to said means of calculation.

Advantageously, said means of calculation furthermore comprise means for transforming these first presets into corresponding presets expressed in terms of load factor in such a way as to form said avoidance presets.

In a particular embodiment, the avoidance system moreover comprises a means of display for displaying, during the emission of an alarm, a message warning a pilot of a alarm.

In a first embodiment, said avoidance aid means comprises an automatic guidance device which is able to implement a mode of guidance making it possible to guide the aircraft automatically in accordance with avoidance presets received from said means of calculation.

In this case, advantageously, the avoidance system many furthermore comprise a means of actuation able to be actuated by the pilot and making it possible, when it is actuated, to trigger the guidance mode implemented by the automatic guidance device.

In a second embodiment, said avoidance aid means comprises a flight director which implements a display mode making it possible to display information representative of avoidance presets received from said means of calculation.

In this case, advantageously, the avoidance system may furthermore comprise a means of actuation able to be actuated by the pilot and making it possible, when it is actuated, to trigger the display mode implemented by the flight director.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
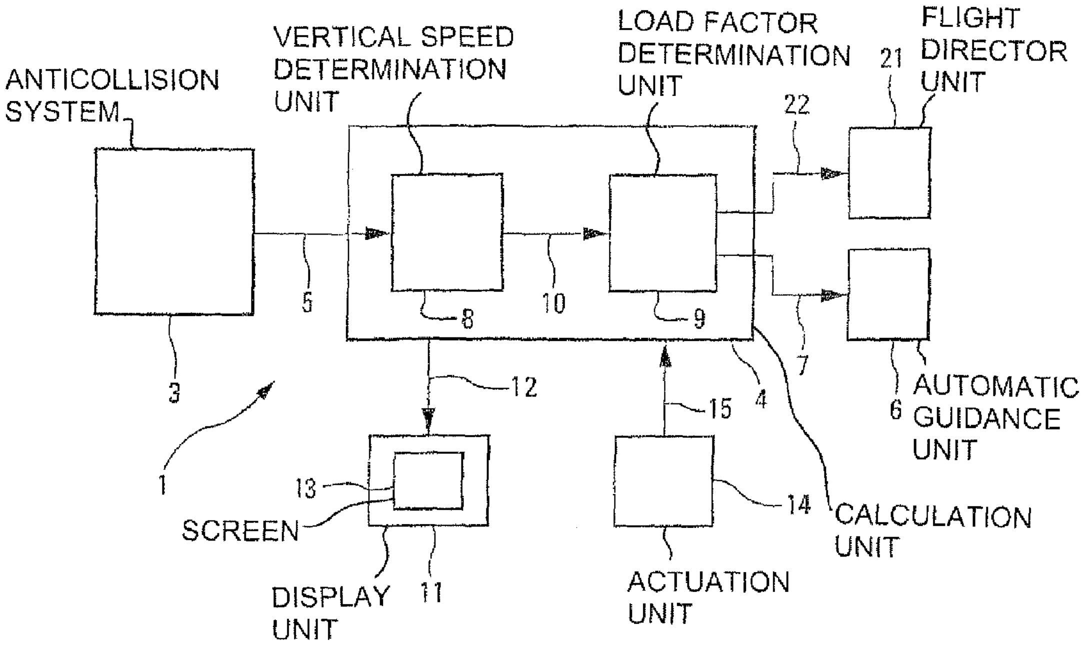
FIG. 1 is a schematic diagram of an avoidance system in accordance with the invention.
Figure 2:
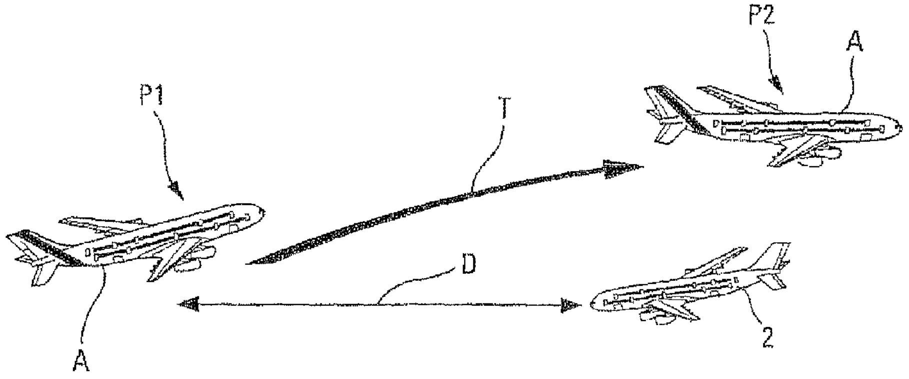
FIG. 2 diagrammatically illustrates an avoidance maneuver.

The system 1 in accordance with the invention and represented diagrammatically in FIG. 1 is carried on board an aircraft A, in particular a transport plane, and is intended to implement an in-flight avoidance of an intruder aircraft 2, as represented in FIG. 2.

To carry out such an in-flight avoidance, said avoidance system 1 comprises a standard anticollision system 3, in particular a TCAS ("Traffic alert and Collision Avoidance System") type, which monitors the trajectories of the various aircraft 2 in proximity to the aircraft A (on board which it is carried) and which is able:

- to detect a risk of collision with at least one intruder aircraft 2; and
- during such a detection, to emit an alarm (corrective alarm or preventive alert) and to determine avoidance information specified hereinbelow.

Such an alarm is emitted when an intruder aircraft 2 is a predetermined distance D (generally expressed in terms of flight duration) from the aircraft A. The avoidance maneuver consists:

- in case of preventive alert, in maintaining the current vertical speed; and
- in case of corrective alarm, in making the aircraft A execute a climb (or a descent) at a defined rate, until the danger is cleared.

This maneuver is performed in particular in the vertical plane in the manner specified hereinbelow, between a position P1 of start of avoidance maneuver and a position P2 of end of avoidance maneuver, following an avoidance trajectory T.

According to the invention, the avoidance system 1 is therefore formed in such a way as to carry out an avoidance following said trajectory T. In a particular variant specified hereinbelow, said avoidance system 1 also makes it possible to carry out a lateral avoidance.

According to the invention, said avoidance system 1 comprises, in addition to said anticollision system 3:

- means of calculation 4 (preferably corresponding to an automatic pilot) which are connected by a link 5 to said anticollision system 3, for automatically determining during the emission of an alarm by said system, on the basis of avoidance information received from said anticollision system 3, at least avoidance presets which make it possible to avoid any risk of collision for the aircraft if they are applied to said aircraft A; and
- at least one avoidance aid device 6, 21 which is connected to said means of calculation 4 by way of a link 7, 22.

In a first embodiment, said avoidance aid device comprises an automatic guidance device 6 which is able to implement a mode of guidance (automatic) making it possible to guide the aircraft A automatically in accordance with avoidance presets received from said means of calculation 4, when on the one hand said means of calculation 4 (automatic pilot) are engaged and on the other hand said guidance mode is triggered. To do this, in standard fashion, said automatic guidance device 6 determines deflection orders in accordance with said avoidance presets (expressed in terms of load factor) and transmits them to standard actuators of standard control surfaces, in particular elevators, of the aircraft A. In a particular variant, these deflection orders may also be determined directly by said means of calculation 4.

It is known that an automatic guidance device 6 ensures excellent performance for all captures and all maintainings of presets and better reproducibility than a pilot. Also, the maneuver carried out by said automatic guidance device 6 is more comfortable and closer to the preset than that carried out manually by a pilot.

Furthermore, an automatic maneuver makes it possible to relieve the pilot of a piloting task (which has been done manually hitherto), thereby leaving him more time in particular to identify the one or more intruder aircraft 2 during this highly stressful situation (of intrusion and of avoidance).

The avoidance system 1 in accordance with the invention thus makes it possible to prevent abrupt variations in load factor, by carrying out an optimal maneuver and accurate feedback control with regard to the preset. This gives rise in particular at the level of the aircraft A to better comfort for the passengers, a greater safety margin vis-à-vis the flight envelope, a minimal discrepancy with respect to the preset altitude and hence a reduced disruption of the air traffic.

It will be noted furthermore that said avoidance system 1 makes it possible to have the aircraft A track the information delivered by the anticollision system 3, while remaining as near as possible to the prescribed altitude and while generally preserving the tracking of the lateral flight plan.

In a particular embodiment, said means of calculation 4 comprise, as represented in FIG. 1:

- means 8 for determining in the manner indicated hereinafter, on the basis of avoidance information likewise specified hereinbelow and received from said anticollision system 3 through the link 5, first presets which are expressed in terms of vertical speed and which make it possible to avoid a collision; and
- means 9 which are connected by a link 10 to said means 8 for transforming in a standard manner these first presets (of vertical speed) into corresponding presets expressed in terms of load factor in such a way as to form said avoidance presets (which are transmitted to the automatic guidance device 6 through the link 7).

In a particular embodiment, said means of calculation 4 also determine (on the basis of avoidance information received from said anticollision system 3) auxiliary avoidance presets making it possible to carry out an avoidance in a lateral plane, and they also transmit these auxiliary avoidance presets to said avoidance aid device 6, 21.

Additionally, in a particular embodiment, the means 9 implement the following steps to calculate a load factor preset Nz:

- they calculate the difference between a first vertical speed preset received from said means 8 and a vertical speed measured (in standard fashion) of the aircraft A;
- they apply a filter to this difference (filtering over time, so as to filter variations which are brief in the course of time); and
- they multiply this filter difference by a gain dependent on the speed of the aircraft A (preferably the air speed, for example VCAS: "Calibrated Air Speed").

Within the framework of the present invention, the mode of guidance implemented by the automatic guidance device 6 may be triggered in various ways.

For this purpose, in a first particular embodiment, said avoidance system 1 furthermore comprises:

- a means of display 11 which is for example connected by a link 12 to said means of calculation 4 for displaying, in particular on a viewing screen 13 (for example a primary piloting screen), during the emission of an alarm, a warning message warning a pilot of this alarm and requiring him to actuate a means of actuation 14A provided for this purpose (and forming part of a set 14 of means of actuation, which is represented in a general and diagrammatic manner in FIG. 1); and
- said means of actuation 14A which is therefore able to be actuated by the pilot and which makes it possible, when it is actuated, to trigger the guidance mode implemented by the automatic guidance device 6 (to which it is for example connected by way of a link 15).

Figure 3:
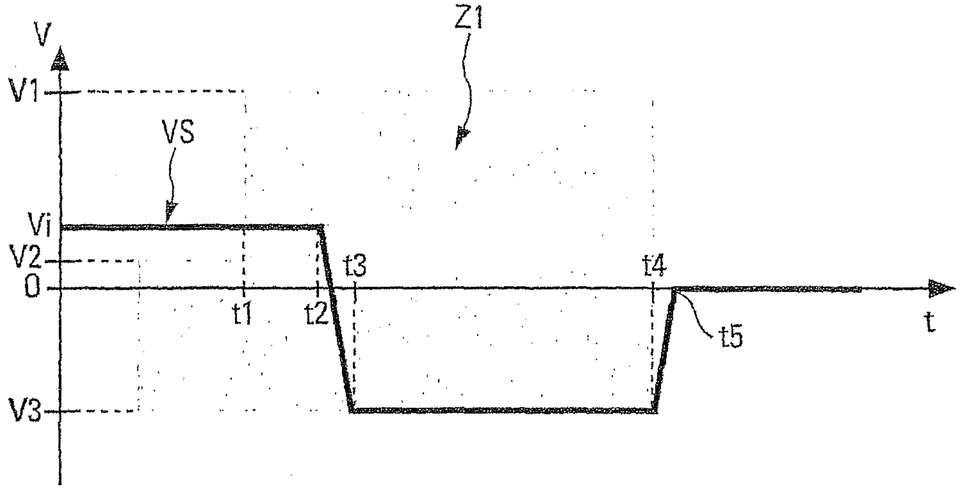
FIGS. 3 and 4 are two graphs making it possible to illustrate an avoidance maneuver in accordance with the invention, in two different situations.

FIG. 3 illustrates the variation in the vertical speed V as a function of time t in an example relating to said first aforesaid particular embodiment. The vertical speed of the aircraft A is illustrated by a curve VS. Represented moreover in this FIG. 3 is a prohibited zone Z1 corresponding to the emission of a corrective alarm and defined by vertical speeds V1, V2 and V3.

The automatic pilot 4 is assumed to be previously engaged and it guides the aircraft A at an initial speed Vi. At a time t1, a corrective alarm is emitted by the anticollision system 3 and the display means 11 emits a warning message. At a following time t2, the pilot actuates the means of actuation 14A and thus triggers the guidance mode implemented by the automatic guidance device 6, thereby bringing about an automatic modification of the virtual speed which is brought to the limit of the prohibited zone Z1 (speed V3 attained at a time t3).

The aircraft A is piloted automatically at this speed V3 up to a time t4 where the anticollision system 3 emits an end-of-alarm signal. The automatic guidance mode is then stopped, and the aircraft A is brought to a zero vertical speed (attained at a time t5).

Furthermore, in a second preferred embodiment, said automatic pilot 4 and said automatic guidance device 6 are formed so that said guidance mode is triggered automatically during the emission of an alarm by said anticollision system 3, if said automatic pilot 4 is previously engaged. This makes it possible to relieve the pilot of the obligation to carry out this triggering and thus of the entire avoidance procedure which is done automatically. However, said guidance mode is in this case able to be stopped by the pilot, by the actuation of an appropriate means of actuation 14B provided for this purpose (and forming part of the set 14), in particular in case of untimely triggering.

Moreover, according to the invention, during the emission of an alarm, if the automatic pilot 4 is not engaged at this moment, according to a first variant, said guidance mode implemented by the automatic guidance device 6 is not triggered. However, it is triggered automatically as soon as a pilot subsequently engages said automatic pilot 4, as represented in FIG. 4.

Figure 4:
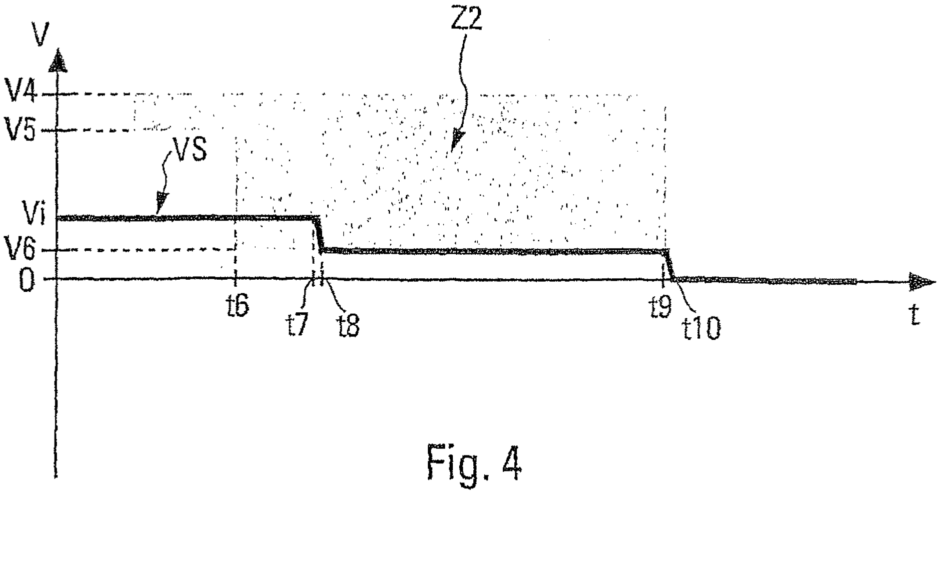

Represented in this FIG. 4 is a prohibited zone Z2 defined by vertical speeds V4, V5 and V6, and the aircraft A initially exhibits a vertical speed Vi. The automatic pilot 4 is not engaged. At a time t6, the aircraft A enters the zone Z2, and a corrective alarm is emitted. The guidance mode is not triggered as long as the automatic pilot 4 remains disengaged. At a time t7, the pilot engages the automatic pilot 4, thereby automatically triggering the guidance mode implemented by the automatic guidance device 6. The vertical speed then passes from Vi to V6 between t7 and t8. At a subsequent time t9, an end-of-alarm signal is emitted and the vertical speed is brought to a zero speed (attained at a time t10).

Additionally, according to a second variant, if the automatic pilot 4 is not engaged, it engages automatically and said guidance mode is triggered automatically during the emission of an alarm.

Furthermore, according to the invention, if a (corrective) alarm emitted by the anticollision system 3 is replaced by a preventive alert of aforesaid type also emitted by the anticollision system 3, a guidance mode previously triggered is not stopped and therefore remains operational.

Additionally, in a particular embodiment, a previously triggered guidance mode is stopped automatically, when one of the following situations arises:

- the pilot disengages said automatic pilot 4;
- the pilot triggers another guidance mode;
- the anticollision system 3 emits an end-of-alarm signal. In this case:
  - in a first variant, as indicated previously (FIGS. 3 and 4), the vertical speed of the aircraft A is brought back to a zero speed; and
  - in a second variant, the vertical speed of the aircraft A is chosen so as to get as close as possible to the initial trajectory (before the alarm).

Within the framework of the present invention, said means 8 determine said first presets in such a way as to:

- in a first variant, get as close as possible to a zero vertical speed, while complying with the avoidance information received from said anticollision system 3; and
- in a second variant, minimize the deviation between the avoidance trajectory T of the aircraft A and the trajectory that it had before the alarm.

In standard fashion, said anticollision system 3 emits as avoidance information, as appropriate:

- an indication B1 indicating the presence of an upper prohibited zone (in terms of vertical speed);
- an indication B2 indicating the presence of a lower prohibited zone (in terms of vertical speed);
- a value Vinf corresponding to the lower limit of the vertical speed VS, in the case of an indication B2; and
- a value Vsup corresponding to the upper limit of the vertical speed VS in the case of an indication B1.

Consequently, a corrective alarm is emitted by the anticollision system 3, when:

- an indication B1 or B2 is present; and
- the vertical speed VS of the aircraft A is greater than Vsup or lower than Vinf.

The information B1, B2, VS, Vinf and Vsup may be displayed on a vertical speed scale 16, disposed vertically and associated with a standard display 17 which comprises in particular a symbol 18 of the aircraft A and a horizon line 19, as is represented in FIGS. 5B, 6B, 7B and 8B. This display 17 and the associated vertical speed scale 16 may be presented on a standard control screen 20, for example with the aid of a display means 11.

Figure 5B:
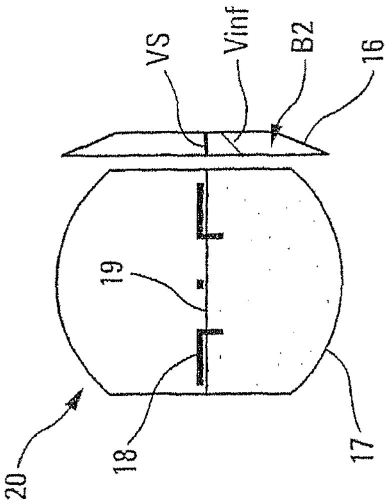
FIG. 5A is a graph and FIG. 5B shows a corresponding control display, which illustrate particular avoidance characteristics.
Figure 5A:
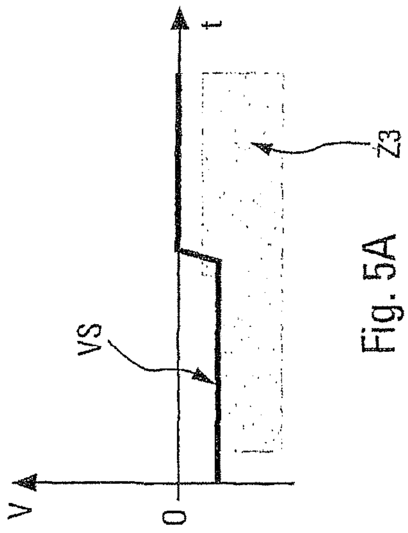

In the case of a single intruder aircraft 2, the means 8 determine said first presets (of vertical speed) so that the aircraft A must take a vertical speed VS:

- which is zero, if this value is not prohibited (FIGS. 5A and 5B). In this case the holding of level is favored; or
- which corresponds to the given preset, namely Vinf in FIGS. 6A and 6B (that is to say the limit of the prohibited zone Z4).

Figure 6B:
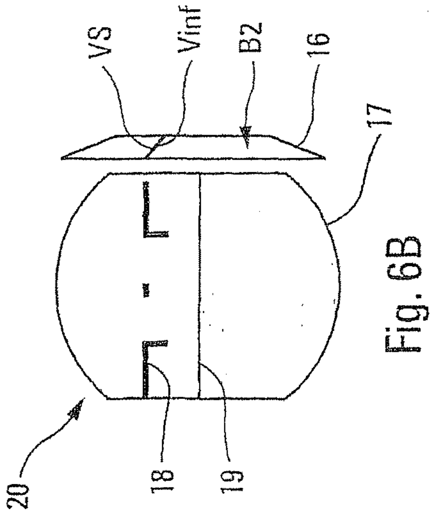
FIGS. 6A and 6B, 7A and 7B, 8A and 8B, 9A and 9B (or 9C) are figures similar to FIGS. 5A and 5B, but relating to other exemplary avoidance maneuvers.
Figure 6A:
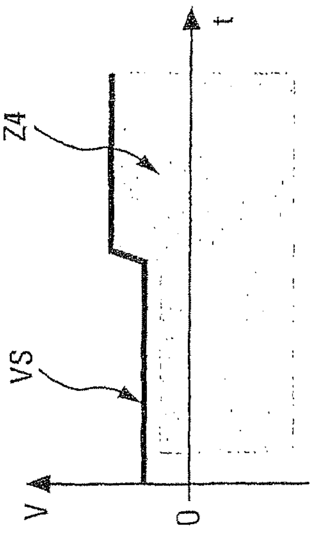

The indication B2 of FIG. 5B is associated with a prohibited zone Z3 of FIG. 5A, and the indication B2 of FIG. 6B is associated with the prohibited zone Z4 of FIG. 6A.

Figure 7B:
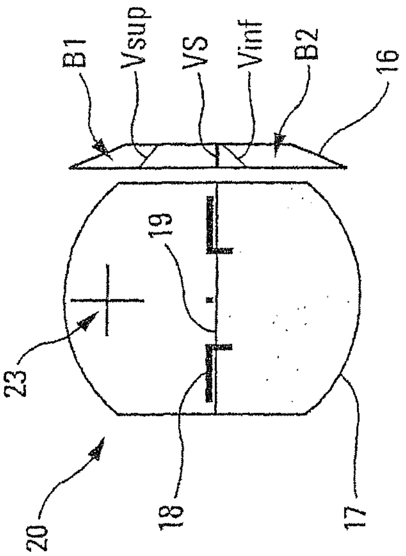
Figure 7A:
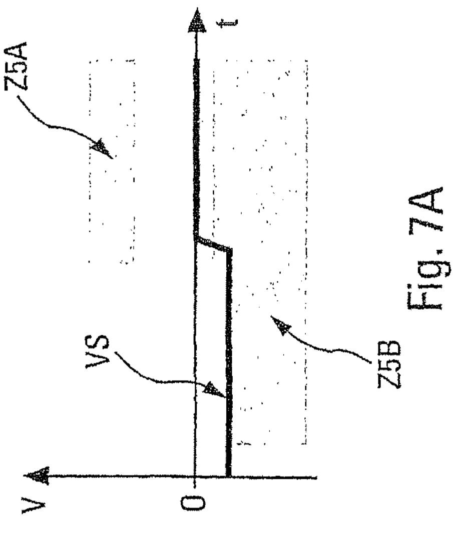
Figure 8B:
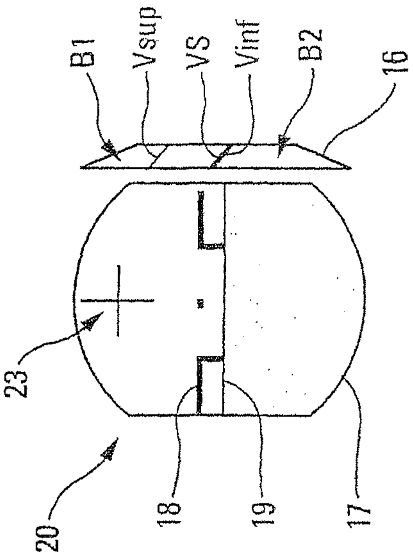
Figure 8A:
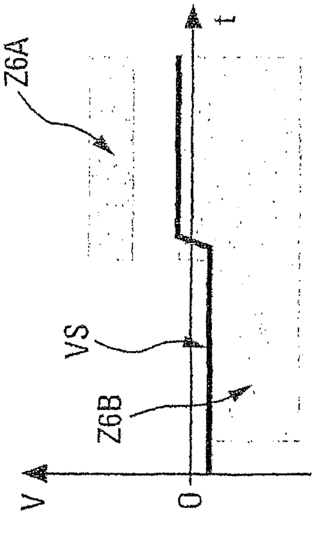

Additionally, in the case of two or more intruder aircraft 2, the means 8 determine said first presets (of vertical speed) so that the aircraft A must take a vertical speed VS:

- which is zero, if this value is not prohibited (FIGS. 7A and 7B); and
- which corresponds to the smaller of the values Vinf and Vsup in terms of absolute value, otherwise (FIGS. 8A and 8B). The rate of climb or of descent is thus limited to the smaller value, so that the discrepancy from the current altitude is as small as possible (and hence so as to come as close as possible to a zero vertical speed).

The indications B1 and B2 of FIG. 7B are associated respectively with prohibited zones Z5A and Z5B of FIG. 7A, and the indications B1 and B2 of FIG. 8B are associated respectively with prohibited zones Z6A and Z6B of FIG. 8A. Represented moreover in FIGS. 7A and 7B is a symbol 23 illustrating the flight director, comprising a horizontal stroke and a vertical stroke, and corresponding to the position towards which the symbol of the aircraft should be brought so as to track the preset.

Figures 9A, 9B, 9C:
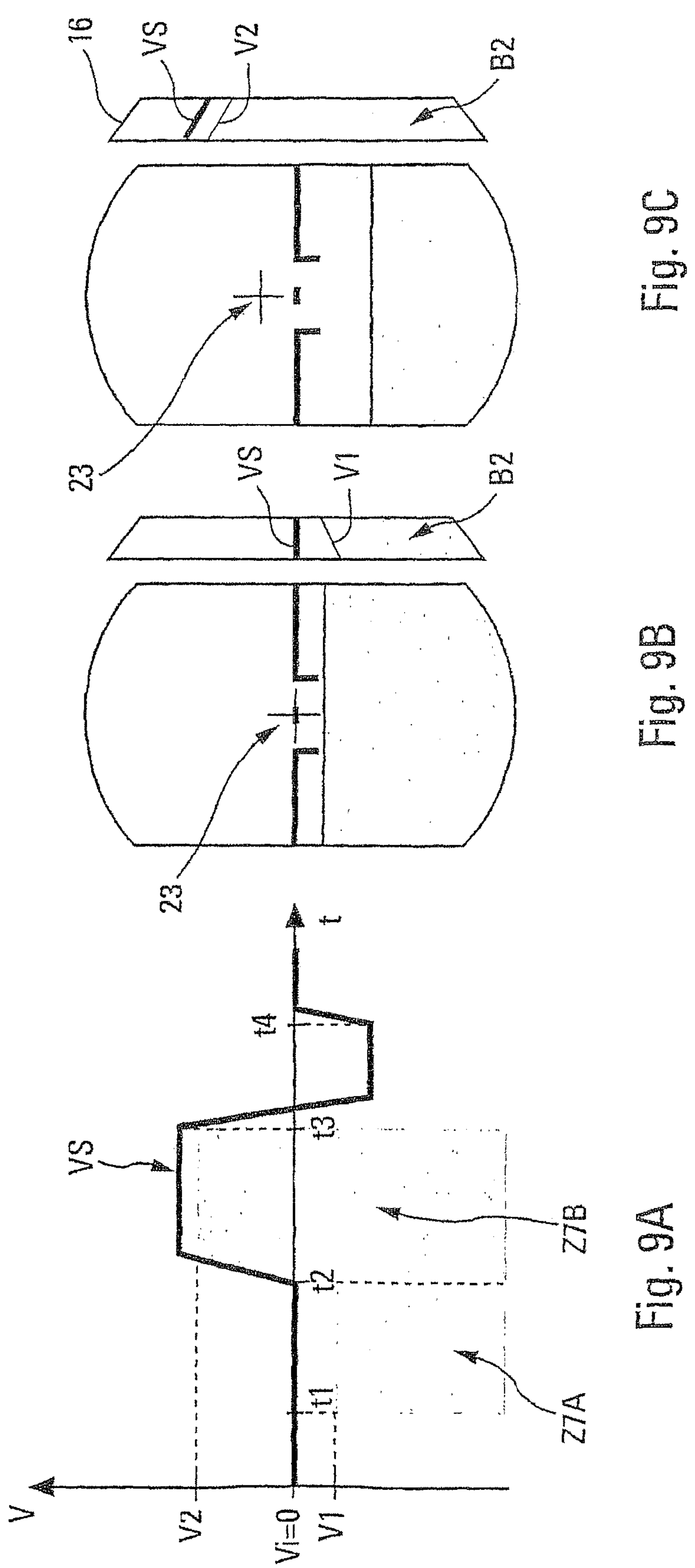

FIGS. 9A, 9B and 9C illustrate a second example corresponding to the case in which the first presets are determined in such a way as to minimize the deviation between the avoidance trajectory T of the aircraft A and the initial trajectory, in the preferred embodiment in which the guidance mode is triggered automatically by the emission of an alarm if the automatic pilot 4 is previously engaged. FIG. 9A is similar to FIGS. 5A, 6A, 7A and 8A. FIGS. 9B and 9C are similar to FIGS. 5B, 6B, 7B and 8B.

FIG. 9A illustrates the variation in the vertical speed V as a function of time t. The vertical speed of the aircraft A is illustrated by a curve VS. Represented in this FIG. 9A is a prohibited zone Z7A corresponding to the emission firstly of a preventive alarm, defined by a vertical speed V1, as well as a prohibited zone Z7B corresponding to the emission of a corrective alarm, defined by a vertical speed V2, consecutive upon said preventive alarm.

The automatic pilot 4 is assumed to be previously engaged, and it guides the aircraft A in level flight at an initial vertical speed Vi=0. At a time t1, a preventive alarm is emitted by the anticollision system 3. FIG. 9B illustrates the corresponding depiction on the primary piloting screen PFD ("Primary Flight Display"). On the vertical speed indicator 16, the current speed VS of the aircraft A at this instant is outside of the prohibited zone B2. For this reason, the automatic pilot 4 does not modify the trajectory of the aircraft A and remains in its current mode of operation, and indicates the enabling of the avoidance mode by a label "TCAS" in blue on the second line of a standard mode indicator (not represented).

At the time t2, a corrective alarm is emitted by the anticollision system 3. At this instant the automatic pilot 4 engages in the avoidance mode, this being signaled by a label "TCAS" colored green on the first line on the aforesaid mode indicator. The automatic pilot 4 calculates a preset speed VS greater than the avoidance information item given by the anticollision system 3, represented by the prohibited zone Z7B in FIG. 9A. It will modify the trajectory of the aircraft A so as to bring it to this preset speed, this being illustrated in FIG. 9C on the speed indicator 16 where this speed VS is positioned above the prohibited zone B2.

At time t3, the anticollision system 3 emits an end-of-alarm information item. The automatic pilot 4 quits the avoidance mode so as to engage automatically on a mode which allows it to rejoin the initial trajectory. The vertical speed VS decreases down to a negative value at which it is maintained until the moment when the aircraft A captures the initial altitude level at time t4.

Represented moreover in FIGS. 9B and 9C is the symbol 23 illustrating the flight director, comprising a horizontal stroke and a vertical stroke, and corresponding to the position towards which the symbol of the aircraft A should be brought so as to track the preset.

As a variant of or as a supplement to the first aforesaid embodiment (according to which the avoidance aid means comprises an automatic guidance device 6), in a second embodiment, said avoidance aid means comprises a flight director 21 which is connected by a link 22 to the means of calculation 4 (automatic pilot) and which implements a mode of display making it possible to display information representative of the avoidance presets received from said means of calculation 4, when it is engaged and when said display mode is triggered. Preferably, said information represents load factor presets.

When this second embodiment is used as a variant to said first embodiment, the flight director 21 provides the pilot with the information allowing him to carry out a manual avoidance, by trucking the presets displayed.

Of course, this second embodiment may also be used as a supplement to said first embodiment. In this case, the avoidance maneuver is carried out automatically with the aid of the automatic guidance device 6 (as stated previously), but the pilot can monitor it and decide at any moment to resume this avoidance maneuver manually, while then benefiting from a continuity of display on the flight director 21 during the change of piloting mode (automatic to manual).

The various modes of triggering the display mode implemented by the flight director 21 correspond, by analogy, to those stated above of the guidance mode implemented by the automatic guidance device 6. For this purpose, the avoidance system 1 can in particular comprise means of actuation 14C and 14D which are similar to the means of actuation 14A and 14B stated above and which also form part of the set 14.

The present invention also exhibits the following characteristics (specified hereinafter in points A to H) and comprises means making it possible to implement these characteristics.

A/ Longitudinal Behavior of the Aircraft A During a Maneuver as a Function of the Type of Alarm In case of preventive alert, two possible cases exist:

- if one is initially in a guidance mode able to vary the vertical speed of the aircraft A (for example an "ILS Glideslope" beam capture mode in the approach phase), there is provision that an engagement of a vertical speed maintain mode guiding the aircraft A towards the current vertical speed; and
- if one is initially in a guidance mode guaranteeing a constant vertical speed (for example an altitude maintain mode), the current guidance mode is maintained (no engagement of a specific avoidance mode TCAS).

In case of corrective alarm, there is provision for an engagement of a specific avoidance mode TCAS guiding towards a target value of vertical speed. This target value is chosen at 100 ft/min of the limit value transmitted by the anticollision system 3.

There is however also provision for the following particular cases:

- if the limit (boundary) value is 0 ft/min, we use 0 ft/min; and
- if the limit value is the current vertical speed of the aircraft A (alarms of maintain vertical speed type), the current vertical speed is used.

B/ Lateral Behavior of the Aircraft A During a Maneuver

The current lateral guidance mode is maintained. Thus, if the aircraft A is turning at the moment of the alarm, this turn is maintained.

If there is initially no guidance mode (neither automatic pilot nor flight director engaged), then a mode of maintaining the current heading is engaged.

C/ Logic of a System for Automatic Control of Thrust

Regardless of the initial state of a standard system for automatic control of the thrust of the engines of the aircraft A during an alarm, said system for automatic control of the thrust is engaged (at the moment of the alarm) in a speed maintain mode. The target speed used by this speed maintain mode is the current speed at the moment of the alarm.

D/ Logic for Exiting an Avoidance Maneuver

Following a preventive alert, there is no provision for any change. The guidance modes (longitudinal and lateral) used for the avoidance maneuver are maintained.

Furthermore, in case of corrective alarm:

- for the longitudinal behavior:
  - a vertical speed maintain mode is engaged. The target value is chosen as follows:
    - if the aircraft A is above the current target altitude (a target altitude is permanently selected and corresponds in general to the last authorization from the air traffic control): −1000 ft/min;
    - if the aircraft A is below the current target altitude:
      - positive value depending on the current altitude Alt (so as to ensure that the climb performance of the aircraft A at the current altitude makes it possible to attain this target value):
      - +1000 ft/min if Alt≤20000 ft;
      - +500 ft/min if 20000<Alt≤30000 ft; and
      - +300 ft/min if Alt>30000 ft; and
  - an altitude capture mode is enabled in such a way as to capture the target altitude once it is attained by the aircraft A; and
- for the lateral behavior, the current guidance mode is maintained.

Additionally, the crew can resume control at any moment with the aid of standard means, in particular:

standard buttons of "instinctive disconnect" type (situated on the lateral mini-stick and on the throttle levers) so as to disconnect the automatic pilot and/or the autolever; and standard buttons for engaging/disengaging the automatic pilot, the flight director and the autolever;

standard interfaces for selecting another guidance mode.

E/ Behavior in Case of Change of Alarm in the Course of a Maneuver

It will be noted that the alarms change often in the course of a maneuver, in particular:

upon a change of limit value; and on passing from a corrective alarm to a preventive alert, or vice versa.

In case of change of alarm, the maneuver is reinitialized, that is to say:

the new limit value is taken into account; and a suitable guidance mode is re-engaged (for example re-engagement of the specific mode TCAS if the crew had resumed control upon the first alarm).

F/ Logic of Altitude Capture in the Course of a Maneuver

In case of preventive alert, if an altitude capture mode was enabled at the moment of the emission of this preventive alert, it is maintained enabled. This authorizes a capture of the target altitude, so as to avoid crossing this target value and thus disturbing the surrounding air traffic (generation of new alarms).

It will be noted that in case of preventive alert, the value 0 ft/min is never in the red zone. An altitude capture always causes the current vertical speed to move away from the red zone.

In case of corrective alarm, if the altitude capture mode was enabled at the moment of the emission of this corrective alarm, then:

if the value 0 ft/min is not in the prohibited domain of vertical speed (red zone), the altitude capture mode is maintained enabled (for the same reasons as hereinabove);

otherwise, it is disabled.

G/ Mathematical Law Used to Devise the Guidance

The law for converting the target vertical speed (VZtarget) into a load factor (NZ), which is used in the present invention, is preferably as follows:

$$NZcom = K\cdot(VZcurrent - VZtarget)$$

in which:

NZcom represents the value of the commanded load factor, which is used to guide the aircraft A;

VZtarget is the value of the target vertical speed, chosen as a function of the presets received from the anticollision system 3; and VZcurrent is the value of the current vertical speed of the aircraft A; and K is a variable dependent on the current speed of the aircraft A.

H/ Man/Machine Interfaces

In case of preventive alert, a specific mode TCAS is presented to the pilot as enabled (for example by being displayed in blue on the second line of a flight mode annunciator zone of a primary piloting screen).

In case of corrective alarm, a specific mode TCAS is presented to the pilot as engaged (for example by being displayed in green on the first line of the flight mode annunciator zone of the primary piloting screen).

In all cases, the existing TCAS displays are maintained.

The invention claimed is:

1. A method of avoiding collision between an aircraft A and an intruder aircraft, while avoiding abrupt variations in load factor, said method comprising the steps of:

a) determining avoidance presets to avoid a collision between the aircraft A and the intruder aircraft, wherein said avoidance presets are determined from avoidance information received from an anticollision system configured for monitoring trajectory of the intruder aircraft in proximity to the aircraft A and producing aircraft collision avoidance information to implement in-flight avoidance between the intruder aircraft and the aircraft A, wherein the avoidance presets are expressed in terms of load factor; and b) transmitting deflection orders, by an automatic guidance unit, to guide the aircraft A to avoid collision with the intruder aircraft, with the deflection orders being based on the determined avoidance presets, wherein in step a), the avoidance presets are determined by a calculation unit configured for: i) determining first resets expressed in terms of vertical seed for avoiding collision between the aircraft A and the intruder aircraft, and ii) transforming the determined first presets into the avoidance presets, wherein the determined first presets:

are determined from the avoidance information received by the calculation unit from the anticollision system, and are transformed into said avoidance presets by:

calculating a difference between a first determined vertical speed preset and a measured vertical speed of the aircraft A, applying a filter to filter variations in the calculated difference over time, and multiplying the filtered calculated difference by a gain dependent on air speed of the aircraft A.

2. The method of claim 1, wherein a flight director unit is configured for implementing a display mode to display information representative of the avoidance presets.

3. The method of claim 1, wherein the first presets are determined to be at substantially zero vertical speed, while complying with the avoidance information.

4. The method of claim 1, wherein the first presets are determined to minimize deviation between an avoidance trajectory of the aircraft A and an initial trajectory.

5. The method of claim 1, wherein the avoidance presets comprise auxiliary avoidance presets for avoiding collision in a lateral plane.

6. The method of claim 1, wherein the automatic guidance unit is configured to trigger an automatic guidance mode when an automatic pilot is engaged.

7. The method of claim 6, wherein the automatic guidance mode is triggered by pilot actuation of an actuation unit.

8. The method of claim 6, wherein the automatic guidance mode is triggered by an alarm.

9. The method of claim 6, wherein the automatic guidance mode is configured to be stopped by pilot actuation of an actuation unit.

10. The method of claim 6, wherein the automatic guidance mode is configured to be triggered automatically when a pilot engages the automatic pilot.

11. The method of claim 1, wherein the automatic guidance unit that transmits the orders to guide the aircraft A is actuated to trigger a guidance mode and an automatic pilot is engaged.

12. The method of claim 1, wherein the automatic guidance unit that transmits the orders to guide the aircraft A is actuated to trigger a guidance mode and a corrective alarm is replaced by a preventive alert while the guidance mode remains operational.

13. The method of claim 1, wherein the automatic guidance unit that transmits the orders to guide the aircraft A is actuated to trigger a guidance mode and the guidance mode is stopped when:

a pilot disengages an automatic pilot;

the pilot triggers another guidance mode; or the anticollision system emits an end-of-alarm signal.

14. The method of claim 1, wherein the determined avoidance presets are transmitted to a flight director unit configured for implementing a display mode to display information representative of the avoidance presets, when an automatic pilot is engaged and when a display mode is triggered to display the information.

15. The method of claim 13, wherein the displayed information represents the determined avoidance presets.

16. The method of claim 2, wherein the flight director unit is configured to implement the display mode to:

display a message to warn a pilot of an alarm; and the display mode is triggered by actuation of an actuation unit by the pilot.

17. The method of claim 13, wherein the display mode is triggered by an emission of an alarm.

18. The method of claim 13, wherein the display mode is stopped by actuation of an actuation unit by a pilot.

19. The method of claim 13, wherein the display mode is triggered by a pilot engaging the flight director unit.

20. The method of claim 13, wherein the display mode is triggered during emission of an alarm.

21. The method of claim 13, wherein the display mode is triggered and a corrective alarm is replaced by a preventive alert while the display mode remains operational.

22. The method of claim 6, wherein when a pilot disengages the at least one automatic guidance unit, the triggered guidance mode is exited, and a display mode is triggered on a flight director unit.

23. The method of claim 1, wherein a preventative alert is emitted under at least one of the following conditions:

the anticollision system is initially in a guidance mode in which the guidance mode varies vertical speed of the aircraft, and a vertical speed maintain mode is engaged to guide the aircraft at current vertical speed; and the anticollision system is initially in a guidance mode in which the guidance mode guides the aircraft at a constant vertical speed, and the preventative alert is emitted while the guidance mode is maintained.

24. The method of claim 1, further comprising a step of emitting a corrective alarm and guiding the aircraft A toward a vertical speed target.

25. The method of claim 5, wherein an alert is emitted under at least one of the following conditions:

the anticollision system is in a lateral guidance mode for avoiding collision in the lateral plane; and a mode for maintaining a current heading is engaged when the anticollision system is not in the lateral guidance mode.

26. The method of claim 1, further comprising a step of emitting an alarm and engaging thrust engines of the aircraft in a speed maintain mode.

27. The method of claim 1, further comprising a step of emitting a preventative alert during guidance and emitting an end-of-alarm signal to exit from guidance based on the avoidance presets.

28. The method of claim 1, further comprising a step of emitting a corrective alarm during guidance and emitting an end-of-alarm signal to exit from guidance based on the avoidance presets.

29. The method of claim 27, further comprising the steps of:

engaging a longitudinal vertical speed maintain mode and an altitude capture mode to capture a target altitude to rejoin initial trajectory; and maintaining a lateral guidance mode.

30. The method of claim 1, further comprising a step of reinitializing guidance of the aircraft A based on a change of alarm status.

31. The method of claim 1, further comprising a step of emitting a preventative alert during guidance and maintaining an altitude capture mode.

32. The method of claim 1, further comprising the steps of:

emitting a corrective alarm, enabling an altitude capture mode, and disabling the altitude capture mode when vertical speed is in a prohibited vertical speed domain.

33. The method of claim 1, wherein the first vertical speed preset is transformed by the calculation unit according to:

$$NZcom = K \cdot (VZcurrent - VZtarget) \text{ in which:}$$

NZcom represents a value of a commanded load factor, which is used to guide the aircraft A;

VZcurrent is a value of current vertical speed of the aircraft A;

VZtarget is a target vertical speed value; and

K is a variable dependent on a current speed of the aircraft A.

34. The method of claim 1, further comprising a step of emitting a preventative alert and presenting an enabled avoidance mode to a pilot.

35. The method of claim 1, further comprising a step of emitting a corrective alarm and presenting an enabled avoidance mode to a pilot.

36. An aircraft collision avoidance system for avoiding collision between an aircraft A and an intruder aircraft, while avoiding abrupt variations in load factor, said system comprising:

an anticollision system configured for measuring trajectory of the intruder aircraft in proximity to the aircraft A and producing aircraft collision avoidance information to implement in-flight avoidance between the intruder aircraft and the aircraft A;

a calculation unit for determining avoidance presets to avoid collision between the aircraft A and the intruder aircraft, wherein the avoidance presets are expressed in terms of load factor, with the calculation unit being configured for:

i) determining first presets expressed in terms of vertical speed for avoiding collision between the aircraft A and the intruder aircraft, wherein the first presets are determined from the avoidance information received from the anticollision system, and ii) transforming the first presets into the avoidance presets by:

calculating a difference between a first determined vertical speed preset and a measured vertical speed of the aircraft A, applying a filter to filter variations in the calculated difference over time, and multiplying the filtered calculated difference by a gain dependent on air speed of the aircraft A; and an automatic guidance unit, connected to said calculation unit, in which the automatic guidance unit transmits deflection orders to guide the aircraft A to avoid collision with the intruder aircraft based on the determined avoidance presets.

37. The aircraft collision avoidance system of claim 36, further comprising flight director unit configured for implementing a display mode to display the avoidance presets.

38. The aircraft collision avoidance system of claim 36, further comprising a pilot actuation unit configured for triggering the automatic guidance unit to guide the aircraft A based on the avoidance presets.

39. The aircraft collision avoidance system of claim 36, wherein the calculation unit is an automatic pilot.

40. The aircraft collision avoidance system of claim 36, further comprising a display unit configured to display a warning message.

41. The aircraft collision avoidance system of claim 36, wherein the automatic guidance unit is configured to transmit the deflection orders to control surfaces of the aircraft A to guide the aircraft A.

* * * * *